United States Patent
Stoia et al.

(10) Patent No.: US 9,376,961 B2
(45) Date of Patent: Jun. 28, 2016

(54) SYSTEM FOR CONTROLLING A FLOW RATE OF A COMPRESSED WORKING FLUID TO A COMBUSTOR FUEL INJECTOR

(71) Applicant: General Electric Company, Schenectady, NY (US)

(72) Inventors: Lucas John Stoia, Taylors, SC (US); Patrick Benedict Melton, Horse Shoe, NC (US); Richard Martin DiCintio, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 644 days.

(21) Appl. No.: 13/845,397

(22) Filed: Mar. 18, 2013

(65) Prior Publication Data

US 2014/0260264 A1    Sep. 18, 2014

(51) Int. Cl.
| | |
|---|---|
| *F02C 6/08* | (2006.01) |
| *F02C 7/22* | (2006.01) |
| *F01D 9/02* | (2006.01) |
| *F02C 9/52* | (2006.01) |
| *F23R 3/04* | (2006.01) |
| *F23R 3/26* | (2006.01) |

(52) U.S. Cl.
CPC ... *F02C 7/22* (2013.01); *F01D 9/02* (2013.01); *F02C 6/08* (2013.01); *F02C 9/52* (2013.01); *F23R 3/045* (2013.01); *F23R 3/26* (2013.01)

(58) Field of Classification Search
CPC ............... F09C 9/18; F02C 6/03; F02C 6/08; F23R 3/34; F23R 3/26; F23R 3/04; F23R 3/045
See application file for complete search history.

(56) References Cited

U.S. PATENT DOCUMENTS

| | | | | |
|---|---|---|---|---|
| 5,161,367 A * | 11/1992 | Scalzo | .................. | F01K 23/062 60/39.12 |
| 5,351,474 A * | 10/1994 | Slocum | ...................... | F23R 3/26 60/39.23 |
| 5,548,951 A * | 8/1996 | Mumford | .................. | F23R 3/26 60/39.23 |
| 9,010,082 B2 * | 4/2015 | Stoia | ....................... | F23R 3/045 60/240 |
| 9,052,115 B2 * | 6/2015 | Stoia | ....................... | F23R 3/346 |
| 2001/0000563 A1 * | 5/2001 | Ojiro | ....................... | F01D 17/10 60/39.092 |
| 2010/0170216 A1 * | 7/2010 | Venkataraman | ........... | F02C 7/22 60/39.37 |
| 2010/0174466 A1 | 7/2010 | Davis, Jr. et al. | | |
| 2010/0236249 A1 * | 9/2010 | McMahan | .................. | F23R 3/26 60/752 |
| 2011/0016878 A1 * | 1/2011 | Berry | ....................... | F02C 7/222 60/785 |
| 2013/0298560 A1 * | 11/2013 | Melton | .................... | F23R 3/346 60/733 |

* cited by examiner

*Primary Examiner* — William H Rodriguez
*Assistant Examiner* — Thomas Burke
(74) *Attorney, Agent, or Firm* — Dority & Manning, PA

(57) ABSTRACT

A system for controlling air flow rate of a compressed working fluid to a fuel injector of a combustor includes an outer casing that defines a high pressure plenum around a portion of the combustor, an extraction port in fluid communication with the high pressure plenum and an inlet port. The combustor includes a plurality of fuel injectors arranged around a combustion liner, an inner flow sleeve, an outer air shield that surrounds the plurality of fuel injectors and the inner flow sleeve. The outer air shield defines an injection an air plenum between the outer air shield and the inner flow sleeve and an inlet to the injection air plenum. An external fluid circuit provides fluid communication between the extraction port and the inlet port. A baffle extends between the outer casing and the outer air shield to provide flow separation between the inlet and the high pressure plenum.

20 Claims, 5 Drawing Sheets

SYSTEM FOR CONTROLLING A FLOW RATE OF A COMPRESSED WORKING FLUID TO A COMBUSTOR FUEL INJECTOR

FIELD OF THE INVENTION

The present invention generally involves a combustor of a gas turbine. More specifically, the invention relates to a system for controlling air flow rate of a working fluid to a combustor having a late lean fuel injector.

BACKGROUND OF THE INVENTION

A typical gas turbine that is used to generate electrical power includes an axial compressor at the front, one or more combustors downstream from the compressor, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows towards a head end of combustor where it reverses direction at an end cover and flows through the one or more nozzles into a primary combustion zone that is defined within a combustion chamber in each combustor. The compressed working fluid mixes with fuel in the one or more fuel nozzles and/or within the combustion chamber and ignites to generate combustion gases having a high temperature and pressure. The combustion gases expand in the turbine to produce work. For example, expansion of the combustion gases in the turbine may rotate a shaft connected to a generator to produce electricity.

In a particular combustor design, one or more fuel injectors, also known as late lean fuel injectors, are circumferentially arranged around the combustion chamber downstream from the nozzles and/or the primary combustion zone. A portion of the compressed working fluid exiting the compressor is routed through the fuel injectors to mix with fuel to produce a lean fuel-air mixture. The lean fuel-air mixture may then be injected into the combustion chamber for additional combustion in a secondary combustion zone to raise the combustion gas temperature and increase the thermodynamic efficiency of the combustor. The late lean fuel injectors are effective at increasing combustion gas temperatures without producing a corresponding increase in the production of undesirable emissions such as oxides of nitrogen ($NO_x$). The late lean fuel injectors are particularly beneficial for reducing NOx during base load and/or turndown operation of the gas turbine. In contrast, during certain non-base load operation modes such as during start-up, cold fuel and liquid fuel operation late lean fuel injection is undesirable, thus the late lean fuel injectors are not fueled.

Although fuel to the late lean fuel injectors may be shut off during operation of the gas turbine, the compressed working fluid flowing to the late lean fuel injectors is routed through a passive circuit that is defined within an outer casing such as a compressor discharge casing and thus cannot be shut off. As a result, the compressed working fluid flows through the late lean fuel injectors and the liner and mixes with the combustion gases flowing through the hot gas path, thereby causing air dilution of the combustion gases which results in undesirable emissions levels. To overcome the effects of the air dilution, an operator must over fire the one or more fuel nozzles that feed the primary combustion zone. However, over firing results in high combustion liner and/or transition duct wall temperatures which limits the mechanical life of those hot gas path components. Therefore, a system for controlling a flow rate of the compressed working fluid to the fuel injectors would be useful.

BRIEF DESCRIPTION OF THE INVENTION

Aspects and advantages of the invention are set forth below in the following description, or may be obvious from the description, or may be learned through practice of the invention.

One embodiment of the present invention is a system for controlling an air flow rate of a compressed working fluid to a fuel injector of a combustor. The system generally includes an outer casing that surrounds at least a portion of the combustor. The outer casing at least partially defines a high pressure plenum that surrounds at least a portion of the combustor. The outer casing includes an extraction port and an inlet port that extend through the outer casing where the extraction port is in fluid communication with the high pressure plenum. A combustor extends at least partially though the high pressure plenum. The combustor includes a combustion liner, a plurality of fuel injectors circumferentially arranged around the combustion liner, an inner flow sleeve that surrounds the combustion liner, an outer air shield that circumferentially surrounds the inner flow sleeve and the plurality of fuel injectors and an injection air plenum defined between the outer air shield and the combustion liner. An inlet to the injection air plenum is in fluid communication with the inlet port. An external fluid circuit provides for fluid communication between the extraction port and the inlet port. A baffle extends radially between the outer air shield and the outer casing. The baffle provides flow separation between the inlet passage to the injection air plenum and the high pressure plenum.

Another embodiment of the present invention is a system for controlling an air flow rate of a compressed working fluid to a fuel injector of a combustor. The system generally includes an outer casing that surrounds at least a portion of the combustor and that at least partially defines a high pressure plenum. The outer casing includes an extraction port and an inlet port that extend through the outer casing where the extraction port is in fluid communication with the high pressure plenum. The combustor includes a late lean fuel injection module. The late lean fuel injection module includes a combustion liner, an inner flow sleeve that circumferentially surrounds a portion of the combustion liner, a plurality of fuel injectors circumferentially arranged around the inner flow sleeve and the combustion liner, an outer air shield that circumferentially surrounds the plurality of fuel injectors and an injection air plenum defined the outer air shield and the inner flow sleeve. The outer air shield at least partially defines an inlet to the injection air plenum where the inlet is in fluid communication with the inlet port. An external fluid circuit provides fluid communication between the extraction port and the inlet port. A baffle extends radially between the outer air shield and the outer casing. The baffle provides flow separation between the inlet passage to the injection air plenum and the high pressure plenum within the outer casing.

The present invention may also include a gas turbine. The gas turbine generally includes a compressor disposed at a forward end of the gas turbine, a combustor that is positioned downstream from the compressor, a turbine that is downstream from the combustor, and a system for controlling an air flow rate of a compressed working fluid to a fuel injector of the combustor. The system generally includes an outer casing that defines a high pressure plenum that surrounds at least a portion of the combustor, the outer casing having an extraction port and an inlet port that extend through the outer casing.

The extraction port is in fluid communication with the high pressure plenum. A combustion liner extends within the outer casing. A plurality of fuel injectors are circumferentially arranged around the combustion liner and an inner flow sleeve circumferentially surrounds a portion of the combustion liner. An outer air shield circumferentially surrounds the inner flow sleeve and the plurality of fuel injectors. An injection air plenum is defined between the outer air shield and the inner flow sleeve. An inlet to the injection air plenum extends through the outer air shield and the inlet is in fluid communication with the inlet port. An external fluid circuit provides fluid communication between the extraction port and the inlet port. The external fluid circuit includes a flow modulation valve disposed downstream from the extraction port and upstream from the inlet port. A baffle extends radially between the outer air shield and the outer casing. The baffle provides flow separation between the inlet to the injection air plenum and the high pressure plenum within the outer casing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
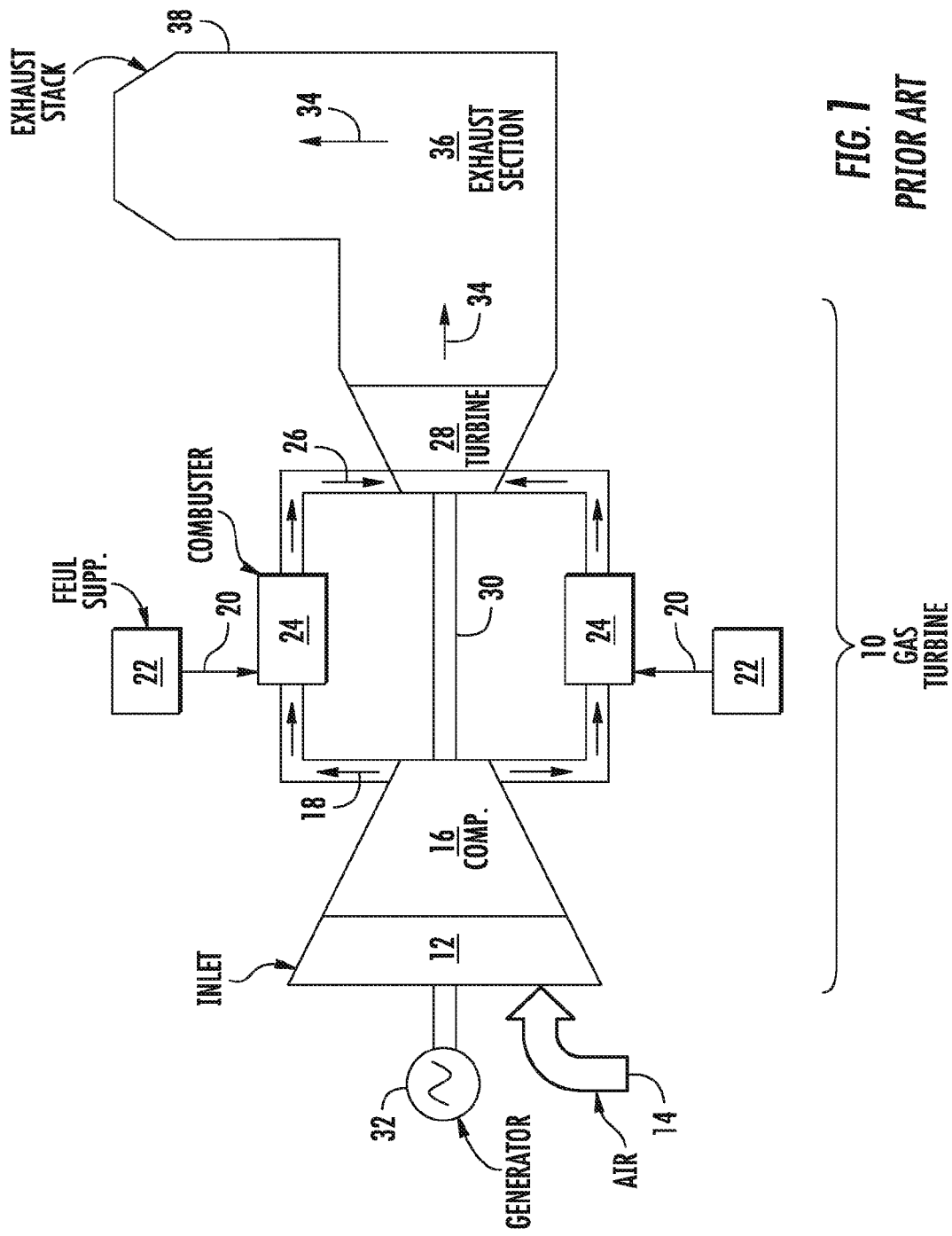
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbomachine and is not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 that is downstream from the turbine 28. The exhaust section 36 may include, for example, a heat recovery steam generator (not shown) for cleaning and extracting additional heat from the exhaust gases 34 prior to release to the environment.

Figure 2:
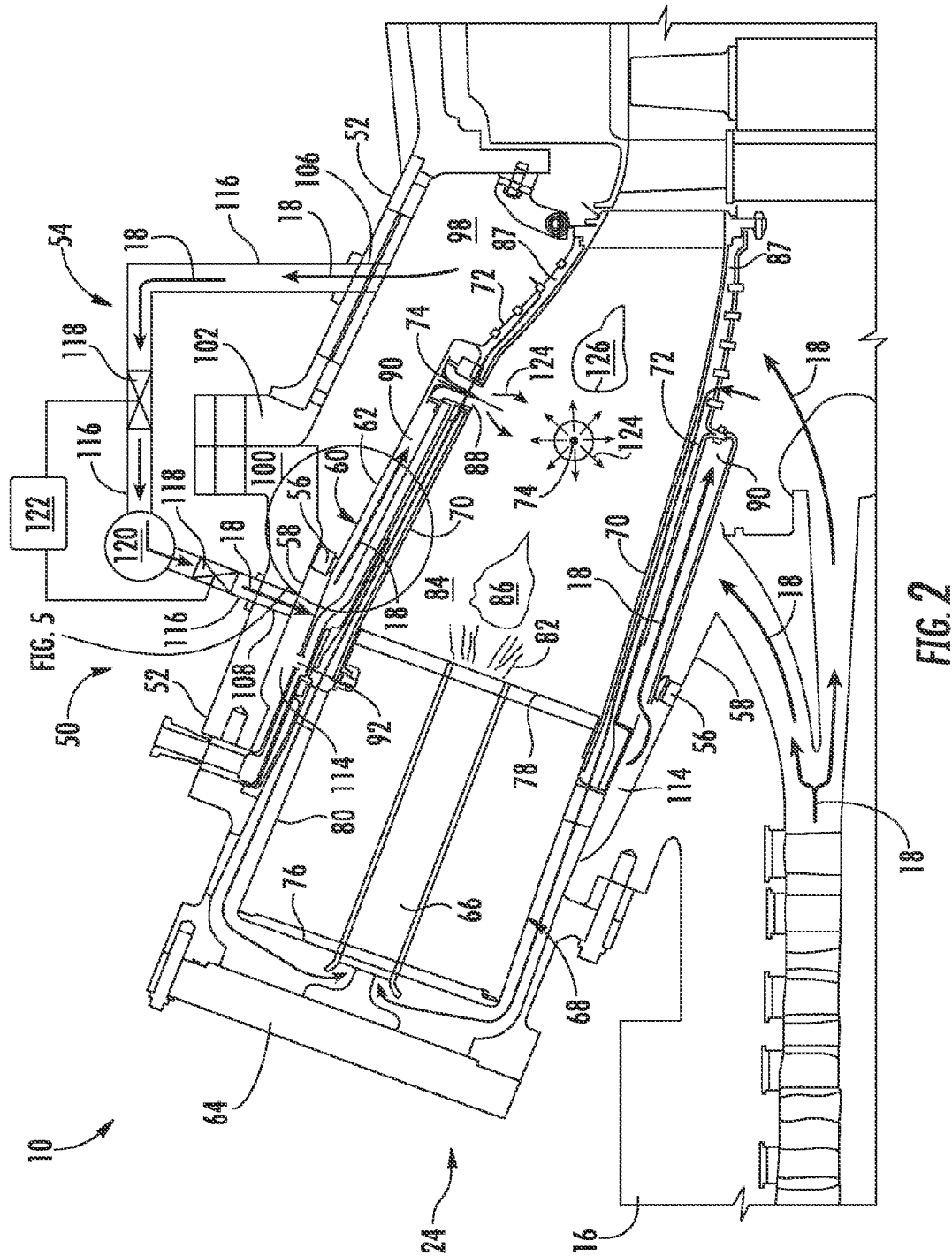
FIG. 2 is a cross-section side view of a portion of an exemplary gas turbine according to at least one embodiment of the present disclosure.

FIG. 2 provides a cross sectional side view of a portion of an exemplary gas turbine 10 including one of the combustors 24 and a system 50 for controlling a flow rate of the compressed working fluid 18 to the combustor 24, herein referred to as the "system 50." As shown, the system 50 generally includes an outer casing 52 such as a compressor discharge casing and/or a turbine casing that is in fluid communication with the compressor 16, an external fluid circuit 54 for routing a portion of the compressed working fluid 18 out of and back into the outer casing 52, and a baffle 56 that extends radially between an inner surface 58 of the outer casing 52 and an outer surface 60 of an outer air shield 62 portion of the combustor 24.

As shown in FIG. 2, the combustor 24 extends at least partially through the outer casing 52. The combustor 24 generally includes an end cover 64 that is coupled to the outer casing 52 at one end of the combustor 24. The combustor 24 further includes at least one axially extending fuel nozzle 66 that extends downstream from the end cover 64, an annular cap assembly 68 that extends radially and axially within the outer casing 52 downstream from the end cover 64, an annular combustion liner or duct 70 that extends downstream from the cap assembly 68, and one or more annular flow sleeves 72 that at least partially surround at least a portion of the combustion liner 70. In particular embodiments, a plurality of radially extending fuel injectors 74 extend through the combustion liner 70 downstream from the at least one axially extending fuel nozzle 66.

The cap assembly 68 generally includes a forward end 76 that is positioned downstream from the end cover 64, an aft end 78 that is disposed downstream from the forward end 76 and one or more annular shrouds 80 that extend at least partially therebetween. In particular embodiments, the at least one axially extending fuel nozzle 66 extends at least partially through the aft end 78 of the cap assembly 66 to provide a combustible mixture 82 that comprises at least in part of the fuel 20 (FIG. 1) and a portion of the compressed working fluid 18 to a combustion chamber 84 for combustion within a primary combustion zone 86 that is downstream from the aft end 78 of the cap assembly 68.

Figure 3:
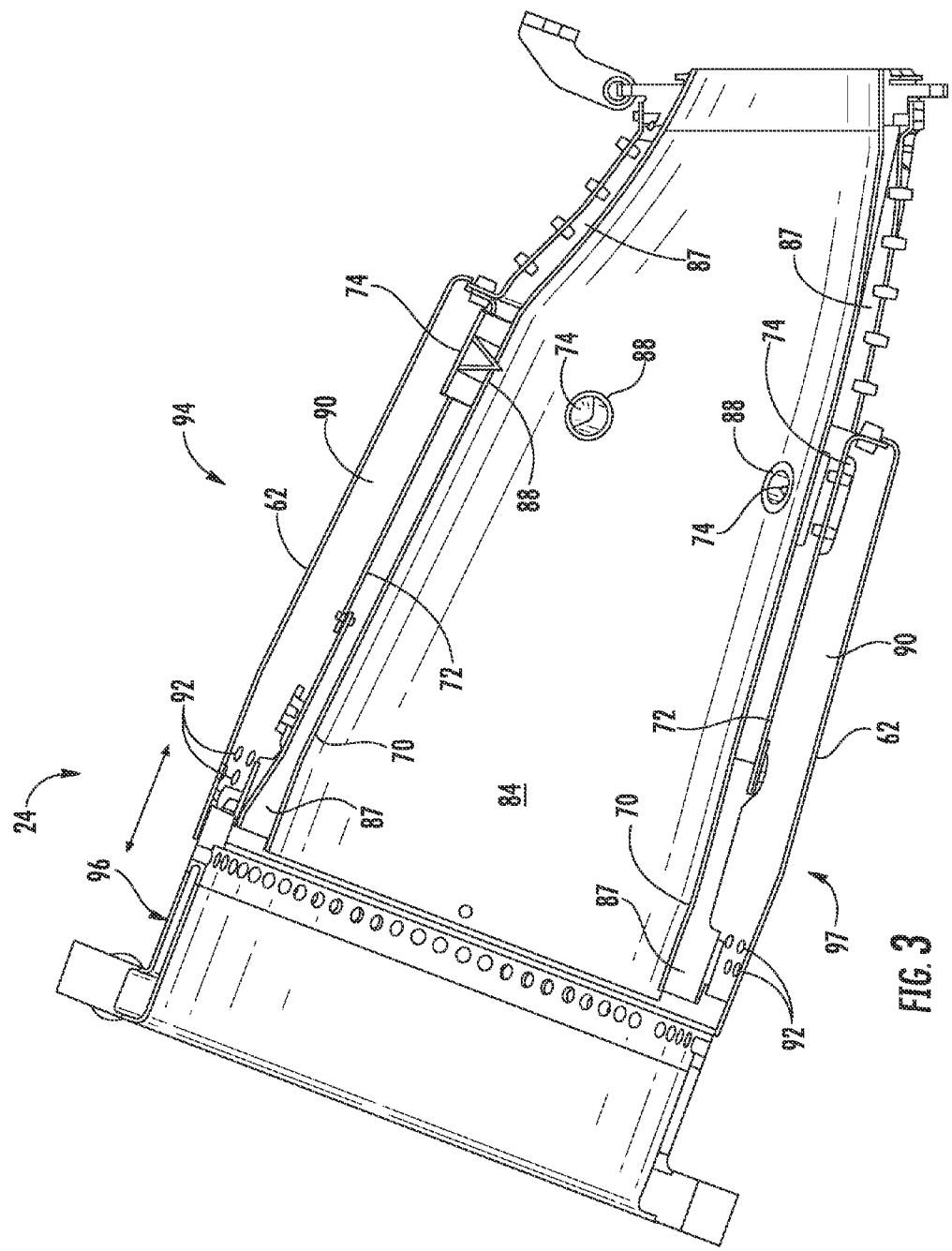
FIG. 3 is a cross-section side view of a portion of the gas turbine as shown in FIG. 2, according to at least one embodiment of the present disclosure.

FIG. 3 provides a cross section side view of a portion of the combustor 24 as shown in FIG. 2 that falls within the scope of various embodiments of this disclosure. As shown in FIG. 3, the combustion liner 70 circumferentially surrounds the combustion chamber 84 and the primary combustion zone 86. The annular flow sleeve(s) 72 may define one or more cooling flow passage(s) 87 for routing the compressed working fluid 18 across an outer surface of the combustion liner 70 for cooling during operation of the combustor 24. In particular embodiments, the plurality of fuel injectors 74 are arranged circumferentially around the combustion liner 70. Each of the plurality of fuel injectors 74 extend through a corresponding opening 88 that is at least partially defined by the combustion liner 70. Each fuel injector 74 provides fluid communication through the combustion liner 70 to the combustion chamber 84.

As shown in FIG. 3, the outer air shield 62 circumferentially surrounds at least a portion of the combustion liner 70. The outer air shield 62 is generally radially separated from the combustion liner 70 to at least partially define an injection air plenum 90 therebetween. In particular embodiments, at least one of the at least one annular flow sleeve 72 is at least partially circumferentially surrounded by the outer air shield 62. In particular embodiments, the outer air shield 62 circumferentially surrounds the plurality of fuel injectors 74. The plurality of fuel injectors 74 are in fluid communication with the injection air plenum 90. In particular embodiments, the outer air shield 62 at least partially defines an inlet passage 92 to the injection air plenum 90. The outer air shield 62 at least partially surrounds one end of the fuel distribution manifold 96. The plurality of fuel injectors 74 are fluidly connected to the fuel distribution manifold through one or more fluid couplings (not shown) to provide fuel to each fuel injector 74.

In certain embodiments, as shown in FIG. 3, the combustion liner 70, the outer air shield 62 and the fuel injectors 74 may be part of a combustion module 94. The combustion module 94 generally includes an annular fuel distribution manifold 96 that is disposed at a forward end of the combustion module 94 and a fuel injection assembly 97 that extends downstream from the fuel distribution manifold 96. The combustion liner 70, the outer air shield 62 and the fuel injectors 74 are generally included as part of the fuel injection assembly 97.

Figure 4:
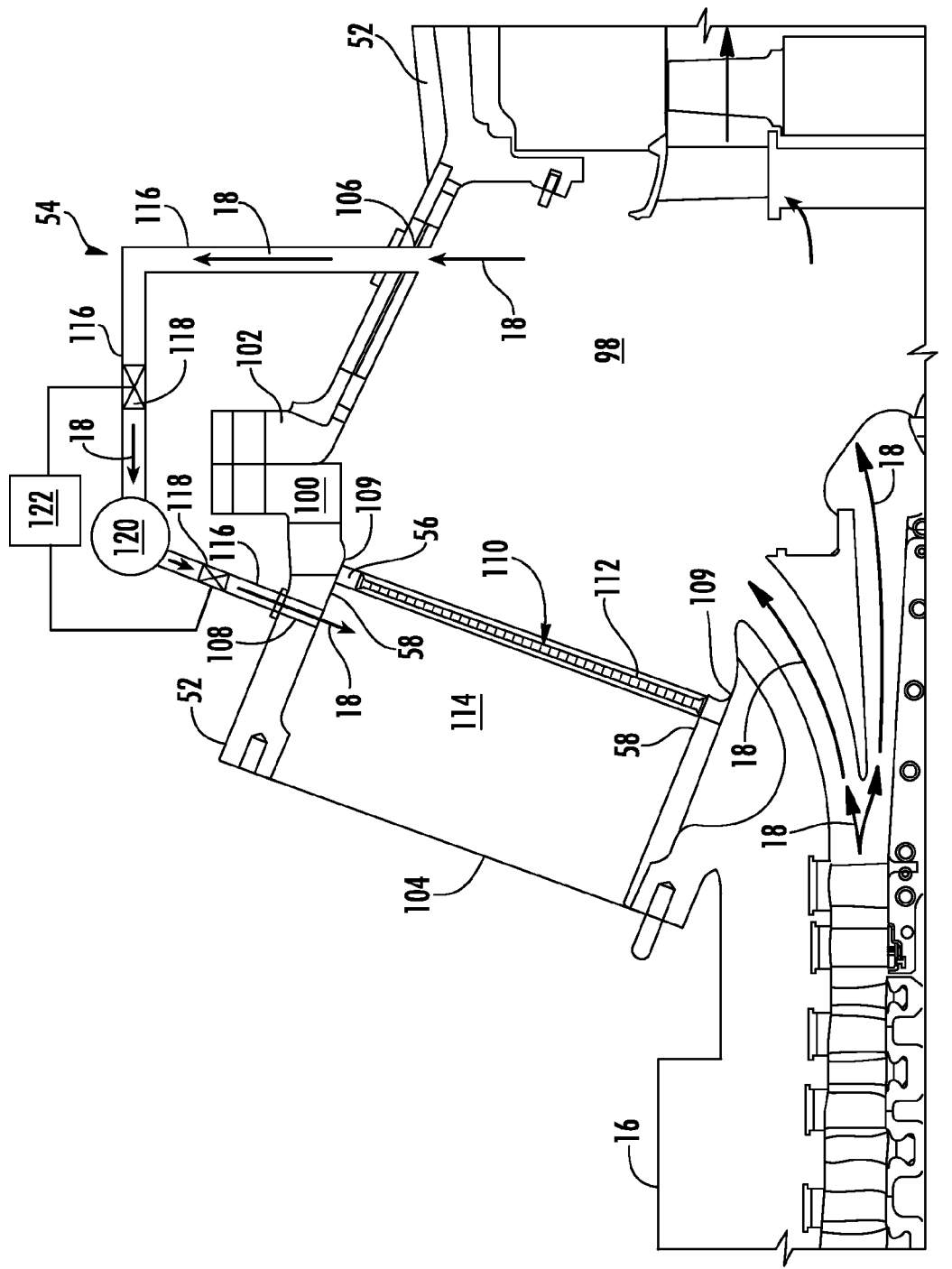
FIG. 4 is a cross-section side view of a portion of the gas turbine as shown in FIG. 2, according to at least one embodiment of the present disclosure.

As shown in FIG. 2, the outer casing 52 at least partially defines a high pressure plenum 98 that surrounds at least a portion of the combustor 24. FIG. 4 provides a cross section view of the portion of the gas turbine 10 as shown in FIG. 2 according to at least one embodiment, with the combustor 24 and/or the combustion module 94 removed for clarity. In particular embodiments, as shown in FIG. 4, the outer casing 52 comprises of a compressor discharge casing 100 and an outer turbine casing or shell 102. The compressor discharge casing 100 and the outer turbine casing 102 at least partially define the high pressure plenum 98. The outer casing 52 at least partially defines a combustor opening 104 for installing and/or supporting the combustor 24. In addition, the outer casing 52 at least partially defines at least one extraction port 106 and at least one inlet port 108. The extraction port(s) 106 and the inlet port(s) 108 each extend at least partially through the outer casing 52 to provide for fluid communication therethrough. The extraction port(s) 106 is in fluid communication with the high pressure plenum 98. In particular embodiments, the extraction port(s) 106 extends through the outer turbine casing 102 and the inlet port(s) 108 extends through the compressor discharge casing 100.

In particular embodiments, as shown in FIG. 4, the baffle 56 extends radially inward from the inner surface 58 of the outer casing 52. The baffle 56 is generally disposed between the extraction port(s) 106 and the inlet port(s) 108. In particular embodiments, the baffle 56 extends radially inward from an inner surface 109 of the compressor discharge casing 100. The baffle 56 may be cast as a singular part with the outer casing 52 or may be joined to the inner surface 58 through any means known in the art that is suitable for the intended environment such as by welding, seating into a channel, screwing or bolting. In particular embodiments, a radial seal 110 such as a spring seal or a hula seal may be disposed along at least a portion of an inner surface 112 of the baffle 56. The seal 110 generally extends radially inward from the inner surface 112 of the baffle 56.

In particular embodiments, as shown in FIG. 2, the baffle 56 extends radially between the outer surface 60 of the outer air shield 62 and the inner surface 58 of the outer casing 52. In this manner, the outer air shield 62, the outer casing 52 and the baffle 56 at least partially define an injection air plenum 114 therebetween. The inlet port(s) 108 provide fluid communication into the injection air plenum 114. The baffle 56 at least partially provides flow separation between the inlet passage 92 to the injection air plenum 90 and the high pressure plenum 98 within the outer casing 52 and/or between the injection air plenum 114 and the high pressure plenum 98.

As shown in FIGS. 2 and 4, the external fluid circuit 54 generally comprises of one or more fluid conduits 116 such as pipes that provide for fluid communication between the extraction port(s) 106 and the inlet port(s) 108 outside of the outer casing 52. In particular embodiments, the external fluid circuit 54 includes one or more flow modulation valves 118 to control a flow rate of the compressed working fluid between the extraction port(s) 106 and the inlet port(s) 108. The flow modulation valve(s) 118 are generally disposed downstream from the extraction port(s) 106 and upstream from the inlet port(s) 108. The flow modulation valve(s) 118 may include any type of flow control valve know in the industry such as butterfly or ball type valve(s).

In one embodiment, the fluid circuit 54 further comprises a fluid distribution manifold 120. The fluid distribution manifold 120 is disposed downstream from the extraction port(s) 106 and upstream from the inlet port(s) 108. The fluid distribution manifold 120 may extend circumferentially around at least a portion of the outer casing 52.

In particular embodiments, the gas turbine 10 includes a plurality of the combustors 24 arranged in an annular array around the outer casing 52. At least one of the extraction port(s) 106 provides for fluid communication between the high pressure plenum 98 and the fluid distribution manifold 120. A plurality of the inlet port(s) 108 extend through the outer casing 52 where each inlet port 108 extends through the outer casing 52 generally proximate to one corresponding combustor 24 of the plurality of combustors 24. The fluid circuit 54 further includes a plurality of the flow modulation valves 118. Each or some of the flow modulation valves 118 may be disposed downstream from the extraction port(s) 106 and upstream from the fluid distribution manifold 120. In addition or in the alternative, at least one of the plurality of the flow modulation valves 118 may be disposed downstream from the fluid distribution manifold 120 and upstream from a corresponding one of the plurality of inlet ports 108. This embodiment allows for fewer extraction ports 106 from the outer casing while allowing for control of the air flow rate of the compressed working fluid 18 from the high pressure plenum 64 to each combustor 24.

In particular embodiments, the flow modulation valve(s) 118 are coupled to an electronic controller 122. The controller 122 may be any controller that is suitable for causing the flow modulation valve(s) 118 to actuate to an at least partially open and/or closed position in response to a user input or in response to a feedback signal from a sensor (not shown) disposed on and/or within the gas turbine 10. For example, the controller 122 may be a General Electric SPEEDTRONIC™ Gas Turbine Control System. The controller 122 may be and/or may include a computer system having a processor(s) that executes programs to control the operation of the flow modulation valve(s) 118.

Figure 5:
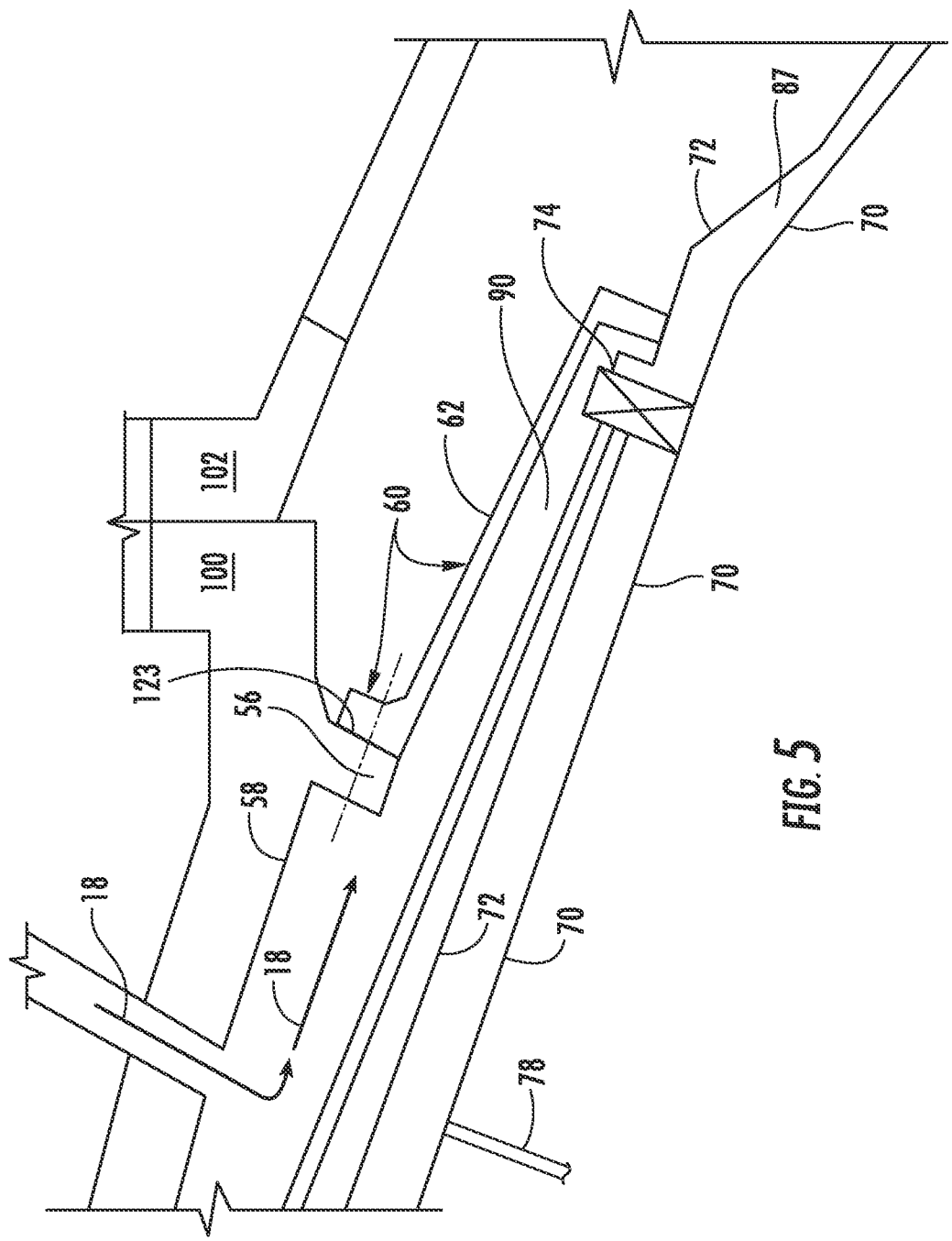
FIG. 5 provides an enlarged cross section side view of a portion of the gas turbine as shown in FIG. 2, according to one embodiment of the present disclosure.

FIG. 5 provides an enlarged cross section side view of a portion of the gas turbine as shown in FIG. 2, according to one embodiment of the present disclosure. As shown in FIG. 5, the outer air shield 60 is engaged with and/or placed adjacent to a side portion 123 of the baffle 56. The outer air shield 60 may be rigidly connected to one of the flow sleeves 72. In the alternative, the outer air shield 60 may be slidingly engaged with the flow sleeve 72 to allow for thermal expansion of the compressor discharge casing 100 during operation of the gas turbine.

In operation, as presented in FIGS. 2 through 4, the compressed working fluid 18 flows from the compressor 16 and is routed into the high pressure plenum 98. A first portion of the compressed working fluid 18 is routed through the cooling flow passage(s) 87 towards the end cover 64 where it reverses direction and is then directed through the axially extending fuel nozzle(s) 66. The first portion of the compressed working fluid 18 is mixed with fuel 22 (FIG. 1) to form the combustible mixture 82 that is injected into the combustion chamber 84 for combustion in the primary combustion zone 86. During certain operation modes of the gas turbine 10 such as during base-load or turn down operation, the flow modulation valve(s) 118 are actuated to an at least partially open position to allow a second portion of the compressed working fluid 18 to flow from the high pressure plenum 98 through the extraction port(s) 106 along the external fluid circuit 54 and through the inlet port(s) 108 into the injection air plenum 114.

The baffle 56 provides a flow separation barrier between the high pressure plenum 98 and the injection air plenum 114 to allow the flow modulation valve(s) 118 to control the flow rate of the second portion of the compressed working 18 flowing between the high pressure plenum 98 and the injection air plenum 114. The flow modulation valve(s) 118 may be actuated to increase or decrease the flow rate of the second portion of the compressed working fluid 18 that flows from the high pressure plenum 98 through the fluid circuit 54 and into the injection air plenum 114. The second portion of the compressed working fluid 18 is then routed through the inlet passage 92 into the injection air plenum 90 and into each of the plurality of fuel injectors 74 where it is mixed with fuel to provide a second combustible mixture 124. The second combustible mixture 124 is then injected through the combustion liner 70 and is burned in a secondary combustion zone 126 that is generally downstream from the one or more openings 88, thereby increasing the performance of the combustor without significantly increasing emissions levels.

During certain operation modes of the gas turbine 10 such as during cold fuel operation, liquid fuel operation and/or start-up operation, the flow modulation valve(s) 118 may be at least partially or fully closed to restrict or to eliminate the flow of the second portion of the compressed working fluid 18 through the external fluid circuit 54 and into the injection air plenum 90, thereby reducing or preventing air dilution to the combustion gases flowing from the primary combustion zone 86. The baffle 56 provides a flow barrier between the outer casing 52 and the outer air shield 62 to reduce or prevent air leakage between the high pressure plenum and the injection air plenum. As a result, the first and the second portions of the compressed working fluid 18 may be routed through the cooling flow passage(s) 87 towards the end cover 64, thereby improving cooling of the combustion liner 70 and/or the cap assembly 68. In addition, the additional compressed working fluid 18 may enhance combustion further improving the overall performance of the combustor 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling an air flow rate of a compressed working fluid to a fuel injector of a combustor, comprising:
   a. an outer casing that surrounds at least a portion of the combustor, the outer casing at least partially defining a high pressure plenum that surrounds at least a portion of the combustor, the outer casing having an extraction port and an inlet port that extend through the outer casing, the extraction port being in fluid communication with the high pressure plenum;
   b. wherein the combustor extends at least partially though the high pressure plenum, the combustor having a combustion liner, a plurality of fuel injectors circumferentially arranged around the combustion liner, an inner flow sleeve that surrounds the combustion liner, an outer air shield that circumferentially surrounds the inner flow sleeve and the plurality of fuel injectors, an injection air plenum defined between the outer air shield and the combustion liner, and an inlet to the injection air plenum, wherein the inlet is in fluid communication with the inlet port;
   c. an external fluid circuit that provides fluid communication between the extraction port and the inlet port; and
   d. an annular baffle plate that extends radially between the outer air shield and the outer casing, the annular baffle plate providing flow separation between the inlet to the injection air plenum and the high pressure plenum.

2. The system as in claim 1, wherein the external fluid circuit comprises a flow modulation valve disposed downstream from the extraction port and upstream from the inlet port.

3. The system as in claim 2, further comprising a controller communicatively coupled to the flow modulation valve.

4. The system as in claim 1, wherein the external fluid circuit comprises a flow distribution ring downstream from the extraction port and upstream from the inlet port, the flow distribution ring extending circumferentially around at least a portion of the outer casing.

5. The system as in claim 1, wherein the annular baffle plate extends radially from an inner surface of the outer casing towards the outer air shield.

6. The system as in claim 4, further comprising a radial seal that extends between the annular baffle plate and the outer air shield.

7. The system as in claim 1, wherein the baffle, the outer air shield and the outer casing at least partially define an injection air plenum, wherein the injection air plenum is in fluid communication with the inlet port and the inlet to the injection air plenum.

8. The system as in claim 1, wherein the outer air shield is connected to a side portion of the annular baffle plate.

9. The system as in claim 8, wherein the extraction port extends through an outer turbine casing and the inlet port extends through the outer casing.

10. A system for controlling an air flow rate of a compressed working fluid to a fuel injector of a combustor, comprising:
  a. an outer casing that surrounds at least a portion of the combustor, the outer casing at least partially defining a high pressure plenum, the outer casing having an extraction port and an inlet port that extend through the outer casing, the extraction port being in fluid communication with the high pressure plenum;
  b. wherein the combustor includes a late lean fuel injection module, the late lean fuel injection module having a combustion liner, an inner flow sleeve that circumferentially surrounds a portion of the combustion liner, a plurality of fuel injectors circumferentially arranged around the inner flow sleeve and the combustion liner, an outer air shield that circumferentially surrounds the plurality of fuel injectors and an injection an plenum defined between the outer air shield and the inner flow sleeve, the outer air shield at least partially defining an inlet to the injection air plenum, wherein the inlet is in fluid communication with the inlet port;
  c. an external fluid circuit that provides fluid communication between the extraction port and the inlet port; and
  d. an annular baffle plate that extends radially between the outer air shield and the outer casing, the annular baffle plate providing flow separation between the inlet to the injection air plenum and the high pressure plenum within the outer casing.

11. The system as in claim 10, wherein the external fluid circuit comprises a flow modulation valve disposed downstream from the extraction port and upstream from the inlet port.

12. The system as in claim 11, further comprising a controller communicatively coupled to the flow modulation valve.

13. The system as in claim 10, wherein the external fluid circuit comprises a flow distribution ring disposed downstream from the extraction port and upstream from the inlet port, the flow distribution ring extending circumferentially around at least a portion of the outer casing.

14. The system as in claim 10, wherein the annular baffle plate extends radially from an inner surface of the outer casing towards the outer air shield.

15. The system as in claim 14, further comprising a radial seal that extends between the annular baffle plate and the outer air shield.

16. The system as in claim 1, wherein the baffle, the outer air shield and the outer casing at least partially define an injection air plenum, wherein the injection air plenum is in fluid communication with the inlet port and the inlet to the injection air plenum.

17. A gas turbine, comprising:
  a. a compressor disposed at a forward end of the gas turbine, a combustor that is positioned downstream from the compressor, a turbine that is downstream from the combustor, and a system for controlling an air flow rate of a compressed working fluid to a fuel injector of a combustor, the system comprising:
    i. an outer casing that defines a high pressure plenum that surrounds at least a portion of the combustor, the outer casing having an extraction port and an inlet port that extend through the outer casing, the extraction port being in fluid communication with the high pressure plenum;
    ii. a combustion liner that extends within the outer casing, a plurality of fuel injectors circumferentially arranged around the combustion liner, an inner flow sleeve that circumferentially surrounds a portion of the combustion liner, an outer air shield that circumferentially surrounds the inner flow sleeve and the plurality of fuel injectors, an injection air plenum defined between the outer air shield and the inner flow sleeve and an inlet to the injection air plenum, wherein the inlet is in fluid communication with the inlet port;
    iii. an external fluid circuit that provides fluid communication between the extraction port and the inlet port, the external fluid circuit including a flow modulation valve disposed downstream from the extraction port and upstream from the inlet port; and
    iv. an annular baffle plate that extends radially between the outer air shield and the outer casing, the annular baffle plate providing flow separation between the inlet to the injection air plenum and the high pressure plenum within the outer casing.

18. The gas turbine as in claim 17, wherein the annular baffle plate extends radially from an inner surface of the outer casing towards the outer air shield, the system further comprising a radial seal that extends between the annular baffle plate and the outer air shield.

19. The gas turbine as in claim 17, wherein the baffle, the outer air shield and the outer casing of the system at least partially define an injection air plenum, wherein the injection air plenum is in fluid communication with the inlet port and the inlet to the injection air plenum.

20. The gas turbine as in claim 17, wherein the external fluid circuit of the system further comprises a flow distribution ring that is positioned downstream from the extraction port and upstream from the inlet port, the flow distribution ring extending circumferentially around at least a portion of the outer casing.

* * * * *